Feb. 15, 1955   L. R. HEIM   2,701,907
METHOD OF MAKING SWEEPSTICKS
Original Filed June 15, 1949   2 Sheets-Sheet 1
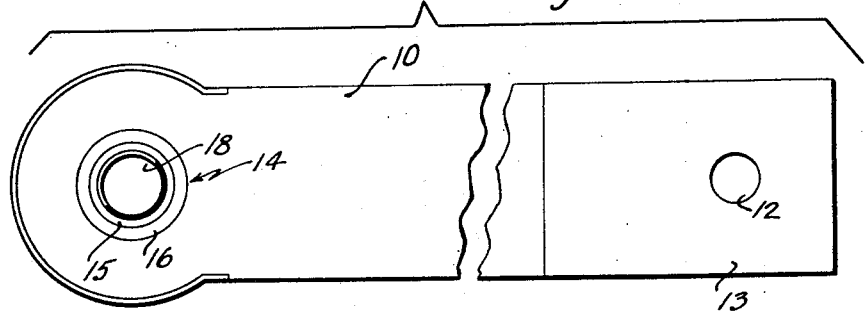
Fig. 1.
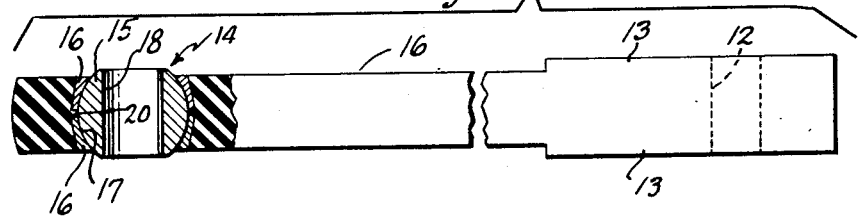
Fig. 2.
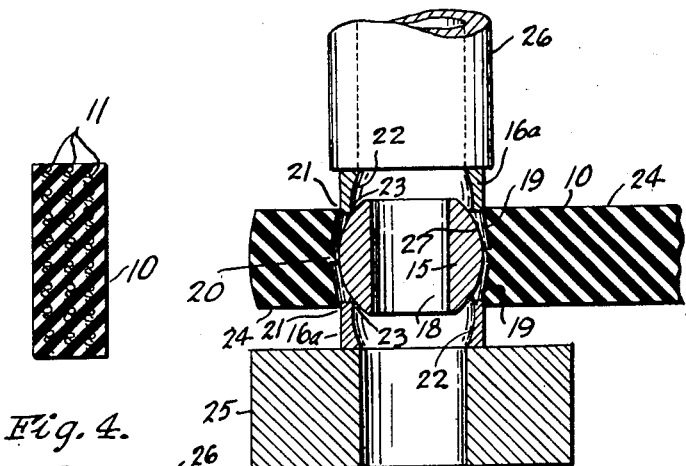
Fig. 3.
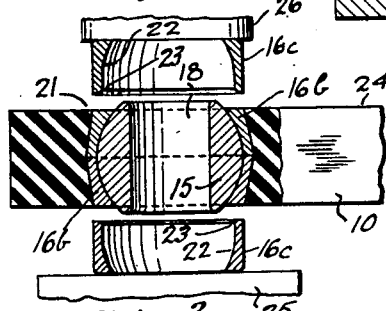
Fig. 4.
Fig. 3a.
Inventor
Lewis R. Heim
By Wooster & Davis Attorneys Feb. 15, 1955  L. R. HEIM  2,701,907
METHOD OF MAKING SWEEPSTICKS
Original Filed June 15, 1949  2 Sheets-Sheet 2
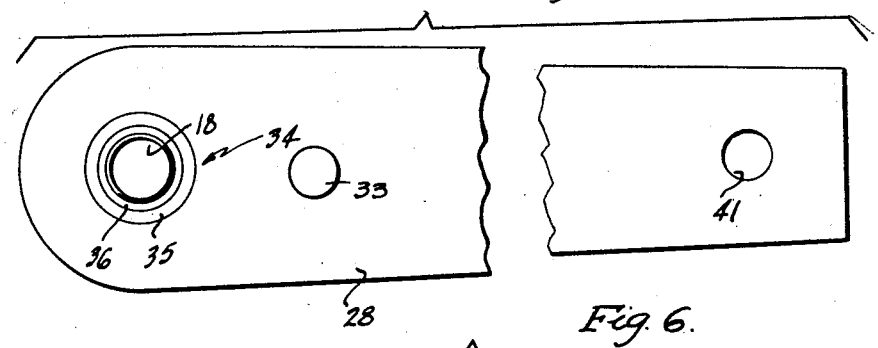
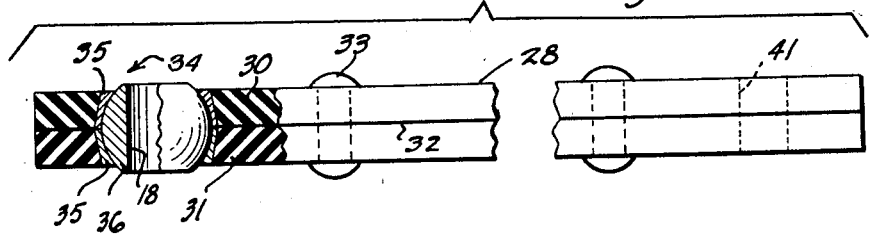
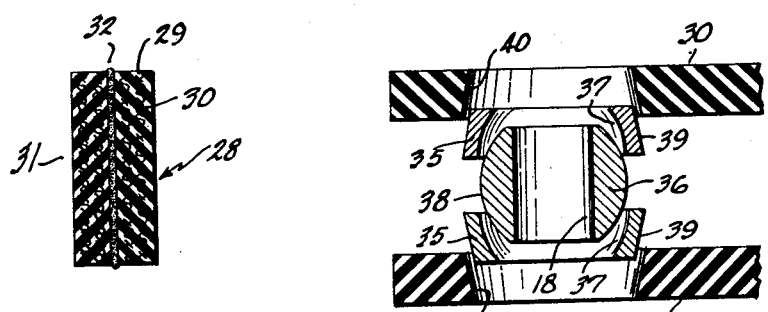
Inventor
Lewis R. Heim
By
Wooster & Davis, Attorneys United States Patent Office 2,701,907
Patented Feb. 15, 1955

2,701,907

METHOD OF MAKING SWEEPSTICKS

Lewis R. Heim, Fairfield, Conn., assignor to The Heim Company, Fairfield, Conn., a corporation of Connecticut Original application June 15, 1949, Serial No. 99,135, now Patent No. 2,662,557, dated December 15, 1953. Divided and this application September 14, 1950, Serial No. 184,801

1 Claim. (Cl. 29—149.5)

This invention relates to sweepsticks for use in looms and the like, and has for an object to provide a new and improved sweepstick which will have sufficient flexibility and resiliency so as to absorb much of the shocks involved in operating the mechanism in shifting the shuttle back and forth through the shed.

A further object is to provide such an improved sweepstick with an improved bearing in at least one end which is capable of lateral rocking movement to compensate for misalignment without causing cramping or other binding action.

Another object is to provide a sweepstick of this character in which is involved a new and improved method and means of mounting such bearing in the sweepstick.

A sweepstick is used in the mechanism of a loom which forces the shuttle back and forth through the shed. This operation involves a considerable shock to the mechanism which is repeated in every operation of the shuttle. It is desirable to provide this mechanism with sufficient flexibility, yielding and resiliency which will absorb much of the shock incident to the operation of the shuttle and of the operating mechanism, to thus eliminate as far as possible breakage of the parts and reduce wear. It is also desirable to have a bearing in the sweepstick capable of compensating for misalignment without cramping or binding. In this invention these desirable results are secured by making either the whole body of the sweepstick or at least a portion of it of a flexible, resilient, yielding, shock-absorbing material, such, for example, as vulcanized rubber or other suitable plastic, or vulcanized rubber or other suitable plastic in which is embedded and vulcanized layers of fabric, such, for example, as canvas. Or it could be of any other suitable, yielding, resilient, shock-absorbing material. A sweepstick of this material not only has a certain amount of yield or resiliency longitudinally to absorb longitudinal strains or shocks but is also capable of a certain amount of lateral bending or yielding, and by mounting in the sweepstick body comprising this material an improved bearing which is capable of lateral rocking movement the construction effectively absorbs both longitudinal and lateral shocks and also compensates for misalignment without binding or cramping effect. This greatly increases the life not only of the sweepstick itself but also of the connected mechanism with which it is used, and improving operation of the device as well as greatly increasing its operative life and efficiency.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

The application is a division of my prior application Serial No. 99,135, filed June 15, 1949, Patent No. 2,662,557, issued December 15, 1953.

In these drawings:

Fig. 1 is a side elevation of one form of my improved sweepstick;

Fig. 2 is a top plan view thereof with portions broken away to more clearly show the construction;

Fig. 3 is a partial section and partial side elevation showing the method of mounting the bearing in the sweepstick;

Fig. 3a is a similar view showing a somewhat modified construction;

Fig. 4 is a transverse section through a portion of the body of the sweepstick;

Fig. 5 is a side view of a somewhat modified construction;

Fig. 6 is a top plan view of the form of Fig. 5 with parts broken away to more clearly show the construction;

Fig. 7 is a detail section showing the method of mounting the bearing in the sweepstick; and Fig. 8 is a transverse section through the body of the sweepstick.

Referring first to Figs. 1 to 4 inclusive, the stick comprises a body 10 of any suitable cross section, preferably substantially rectangular as shown, formed of some suitable yielding, resilient shock-absorbing material, such, for example, as vulcanized rubber or other plastics, which is sufficiently hard and rigid to retain its shape and still has a certain amount of yield, resiliency and flexibility to absorb shocks in operation but still will transmit the necessary force required for this operation. It may be a solid bar of this vulcanized rubber or other plastic, or it could contain a strengthening fabric as indicated at 11, with any suitable number of layers embedded in and vulcanized in the rubber. At one end it may have a bearing 12 for connection to the mechanism with which it is used, and if desired the same may be strengthened and stiffened by thickening, as indicated at 13.

At the opposite end it is provided with an improved bearing 14 including an element capable of lateral rocking movement to compensate for misalignment in the parts connected by this sweepstick. This comprises a metal member 15 the outer surface of which is spherical, and it is mounted in two supporting rings 16 also of metal and having a spherical inner surface 17 corresponding with the outer surface of the spherical member 15. The member 15 has a transverse straight bearing 18 for connection with the operating mechanism. This bearing is mounted in the material of the body 10 by any suitable means and method. As indicated in Fig. 3, the body 10 is provided with recesses 19 opening through its opposite sides and tapered, as indicated. The inner ends of these recesses may be separated by an annular rib 20 of the material of the body 10. The inlet side 21 of this recess is about the same size as or slightly larger than the outer diameter of the rings 16a which after processing form the rings 16 of the bearing. These rings have a concave or spherical inner surface 22 and at their larger ends 23 have an outer diameter about equal to the outer diameter of the member 15 at about the level of the side walls 24 of the body 10, as shown in Fig. 3. In mounting the bearing in the member 10 the device is placed between the die 25 and punch 26 with the thinner edged ends of the ring 16a just entering the recesses 19 and engaging the side walls of the member 15. Then by pressing these two die members together the two rings 16a are forced against the side walls of the member 15, expanding or spreading these rings so that their inner surfaces 22 closely grip and conform to the outer spherical surface 27 of the member 15 as they are forced to the position shown in Fig. 2. The outer diameter of the recesses 19 is made smaller than the outer diameters of these rings when in this final position, so that when the rings are forced to the final position, and are expanded, they also compress the material adjacent to and forming the outer walls of the recesses 19, so that these rings are now held in this position by the pressure and resilient action of the compressed material of the member 10, maintaining a good fit on the spherical member 15 and properly retaining the rings 16 in position. This bearing member 15 can rock laterally to compensate for misalignment between the parts connected by the sweepstick. As the bearing is mounted directly in the resilient material there is also a shock-absorbing support for the bearing.

The form of the device shown in Fig. 3a is the same as that of Figs. 1, 2 and 3, and is put together in the same way except that the rib 20 is omitted and the rings 16b (corresponding to rings 16) embracing the bearing member 15 come together at their inner ends. These rings and therefore the rings 16c which are forced against member 15 to form rings 16b in assembling the bearing are made somewhat longer than rings 16 and 16a. Otherwise the construction, arrangement and functioning of the form of Fig. 3a is the same as that of Figs. 1, 2 and 3.

Referring to the form of the device shown in Figs. 5 to 8 inclusive, the body portion 28 is also formed of suitable yielding, resilient shock-absorbing material and may be vulcanized rubber or other plastics and combination of rubber vulcanized with fabric 29, or other plastics molded with fabric, the same as in the first form. The body of this sweepstick, however, is made of two pieces 30 and 31, laid side by side and secured together by any suitable means, such, for example, as a suitable cement indicated at 32 in Fig. 8, or they could be secured by screws or rivets 33, or combinations of screws, rivets and cement, as found most desirable. The bearing 34 is the same as the bearing 14 of Figs. 1 and 2, except that in this case it is not necessary to expand the rings 35 onto the spherical member 36, although this can be done if desired. That is, these rings may be made with the inner surface 37 formed as a portion of a sphere corresponding to the outer surface 38 of the member 36 and tapered on their outer walls as shown at 39. Each section 30 and 31 of the body 28 of the sweepstick is provided with a tapered circular recess 40 to receive these rings and with the larger diameter facing inwardly. The diameter of these recesses is also less than the outer diameters of the rings 39, so that as the parts are assembled as shown in Fig. 7, and then pressed together to bring the parts to the position shown in Fig. 6, the material surrounding the recesses 40 is compressed, so that when the members 30 and 31 are secured together the bearing is resiliently held by these compressed portions of the resilient material, the same as described in connection with Figs. 1 to 4. The opposite end of the stick may be provided with the bearing 41 corresponding to the bearing 12 of the first form, and this end may be stiffened and reinforced by metal plates 13 the same as in the first form if desired. This sweepstick construction operates and functions the same as the construction shown in Figs. 1 to 4.

It will, therefore, be seen that in all forms the body portion of the sweepstick comprises a yielding, resilient shock-absorbing material which will absorb both longitudinal and lateral shocks, and that all of them include at least at one end a bearing capable of lateral rocking movement to compensate for misalignment between the parts connected by the sweepstick. This provides a sweepstick of strong, durable construction of highly efficient action and in which the component parts are interlocked together but nevertheless the members are free to operate in a manner to yield or absorb shocks resulting from axial thrust, yet permit complete freedom of relative movement to compensate for deflection, misalignment, and possible errors in construction. It will be evident the sweepstick is a very simple one of practical and efficient construction adapted to be manufactured in a practical and efficient way. It provides a practical method of assembling the sweepstick elements in such a manner as to produce an improved construction which will insure freedom of relative movement in operation and yet dependably connect the parts with which they operate.

Having thus set forth the nature of my invention, I claim:

A method of making a sweepstick for looms and the like comprising forming a connecting bar of two longitudinal sections comprising yieldable resilient rubber-like material with each section provided with a tapered socket leading inwardly from one side wall, placing in each socket a retaining mounting ring provided with a spherical inner surface to receive and hold a spherical bearing member and form a bearing for said member to permit rocking movement of said member, placing and pressing said sections together side by side with said sockets opposed and in alignment and with a spherical bearing member in the rings, and at the same time as the sections are pressed together compressing the yieldable resilient material of the bar sections about the respective sockets to grip and hold the rings one in each section by its resilient action and press the respective rings against the bearing member to retain this member in the rings, and securing the longitudinal sections together with the material so compressed.

References Cited in the file of this patent

UNITED STATES PATENTS

| | | |
|---|---|---|
| 1,817,529 | Skillman | Aug. 4, 1931 |
| 1,895,093 | Carlson | Jan. 24, 1933 |
| 2,005,004 | Peo | June 18, 1935 |
| 2,027,560 | Skillman | Jan. 14, 1936 |
| 2,182,487 | Chadbourne et al. | Dec. 5, 1939 |
| 2,304,595 | Prentice | Dec. 8, 1942 |
| 2,366,668 | Heim | Jan. 2, 1945 |
| 2,381,391 | Brown | Aug. 7, 1945 |
| 2,400,506 | Heim | May 26, 1946 |
| 2,445,745 | Moe | July 20, 1948 |
| 2,476,728 | Heim | July 19, 1949 |
| 2,592,566 | Heim | Apr. 15, 1952 |